(12) United States Patent
Seo et al.

(10) Patent No.: US 12,159,603 B2
(45) Date of Patent: Dec. 3, 2024

(54) ELECTRONIC APPARATUS AND CONTROL METHOD THEREOF

(71) Applicant: SAMSUNG ELECTRONICS CO., LTD., Suwon-si (KR)

(72) Inventors: Jeongryeol Seo, Suwon-si (KR); Sangwon Kim, Suwon-si (KR); Youngkook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 239 days.

(21) Appl. No.: 17/686,165

(22) Filed: Mar. 3, 2022

(65) Prior Publication Data

US 2022/0270565 A1 Aug. 25, 2022

Related U.S. Application Data

(63) Continuation of application No. PCT/KR2019/016944, filed on Dec. 3, 2019.

(30) Foreign Application Priority Data

Sep. 26, 2019 (KR) .......................... 10-2019-0119066

(51) Int. Cl.
*G09G 5/00* (2006.01)
*G06F 3/14* (2006.01)
*H04L 67/104* (2022.01)
(52) U.S. Cl.
CPC ........... *G09G 5/003* (2013.01); *G06F 3/1446* (2013.01); *H04L 67/1044* (2013.01); *G09G 2300/026* (2013.01); *G09G 2370/02* (2013.01)

(58) Field of Classification Search
CPC .......................... H04L 67/1044; G06F 3/1446
See application file for complete search history.

(56) References Cited

U.S. PATENT DOCUMENTS 6,611,241 B1 8/2003 Firester et al.
7,565,616 B2 7/2009 Buchmann
(Continued)

FOREIGN PATENT DOCUMENTS

CN 101741664 A 6/2010
CN 110266833 A 9/2019
(Continued)

OTHER PUBLICATIONS

International Search Report (PCT/ISA/210) dated Jun. 24, 2020 issued by the International Searching Authority in International App. No. PCT/KR2019/016944.
(Continued)

*Primary Examiner* — Nicholas P Celani
(74) *Attorney, Agent, or Firm* — Sughrue Mion, PLLC

(57) ABSTRACT

An electronic apparatus communicating with a display apparatus including a plurality of display modules is provided. The electronic apparatus includes an Ethernet switch; and a processor connected to the Ethernet switch and including a virtual Ethernet port to which an Internet Protocol (IP) address is pre-allocated, wherein the processor is configured to: configure a network with an external electronic apparatus based on the IP address, and based on a signal for setting a screen of a display module, among the plurality of display modules, connected to a port of the Ethernet switch being received from the external electronic apparatus through the network, control the Ethernet switch to transmit the signal for setting the screen to the display module.

13 Claims, 8 Drawing Sheets

(56) References Cited

U.S. PATENT DOCUMENTS

| | | | |
|---|---|---|---|
| 10,126,954 B1* | 11/2018 | Qin | G06F 3/067 |
| 10,129,500 B2 | 11/2018 | Masumoto | |
| 10,235,120 B2 | 3/2019 | Cho et al. | |
| 11,102,447 B2 | 8/2021 | Oh | |
| 2006/0164326 A1 | 7/2006 | Date | |
| 2009/0115686 A1 | 5/2009 | Ryou | |
| 2011/0299538 A1* | 12/2011 | Maruta | H04L 12/4641 |
| | | | 370/392 |
| 2016/0070523 A1 | 3/2016 | Kim | |
| 2016/0087967 A1* | 3/2016 | Pang | H04W 76/11 |
| | | | 726/6 |
| 2016/0224306 A1 | 8/2016 | Ryeyna, III et al. | |
| 2017/0134690 A1* | 5/2017 | Masumoto | G06F 3/1438 |
| 2018/0314483 A1* | 11/2018 | Liu | G06F 3/1446 |
| 2018/0314654 A1* | 11/2018 | Long | G06F 9/4403 |
| 2019/0278495 A1* | 9/2019 | Klein | G06F 3/0625 |

FOREIGN PATENT DOCUMENTS

| | | |
|---|---|---|
| JP | 2006-211164 A | 8/2006 |
| JP | 2017-107173 A | 6/2017 |
| JP | 2017-224100 A | 12/2017 |
| KR | 2001-0032752 A | 4/2001 |
| KR | 10-2012-0041917 A | 5/2012 |
| KR | 10-2013-0042735 A | 4/2013 |
| KR | 10-2016-0016523 A | 2/2016 |
| KR | 10-2016-0028713 A | 3/2016 |
| KR | 10-1695931 B1 | 1/2017 |
| KR | 10-2017-0114350 A | 10/2017 |
| WO | 2018142159 A1 | 8/2018 |

OTHER PUBLICATIONS

Written Opinion (PCT/ISA/237) dated Jun. 24, 2020 issued by the International Searching Authority in International App. No. PCT/KR2019/016944.
Communication issued Aug. 16, 2022 by the European Patent Office in European Patent Application No. 19946365.4.
Communication dated Sep. 9, 2023 issued by the China National Intellectual Property Administration in Chinese Application No. 201980100646.8.
Examination Report issued Jun. 10, 2024 by the European Patent Office for European Patent Application No. 19946365.4.
Office Action issued Jul. 26, 2024 by the Korean Patent Office for Korean Patent Application No. 10-2019-0119066.

* cited by examiner

ELECTRONIC APPARATUS AND CONTROL METHOD THEREOF

CROSS REFERENCE TO RELATED APPLICATIONS

This application is a by-pass continuation of International Application No. PCT/KR2019/016944, filed on Dec. 3, 2019, which is based on and claims priority to Korean Application No. 10-2019-0119066, filed on Sep. 26, 2019 in the Korean Intellectual Property Office, the disclosures of which are incorporated by reference herein in their entirety.

BACKGROUND

1. Field

The disclosure relates to an electronic apparatus capable of controlling a display apparatus and a control method thereof, and more particularly, to an electronic apparatus capable of controlling a display apparatus constituting a wall display and a control method thereof.

2. Description of Related Art

Recently, a modular display apparatus including a plurality of display apparatuses has been particularly developed.

The modular display apparatus may provide visual satisfaction to a user by displaying a high-resolution image received from the electronic apparatus through a large screen.

In order to display an image through the modular display apparatus as described above, it is necessary to allocate an Internet Protocol (IP) address to a plurality of display modules included in the modular display apparatus and perform screen settings such as luminance of the plurality of display modules. For this operation, related art electronic apparatuses receive a signal for allocating an IP address of the modular display apparatus and/or a signal for setting a screen from a control device connected through a router, and allocates an IP address to each display module of the modular display apparatus and/or perform screen settings.

Meanwhile, for this operation, it is necessary to preemptively establish a network connection between the electronic apparatus and the control device. Accordingly, the electronic apparatus needs to provide the user with the IP address of the electronic apparatus. However, since an electronic apparatus that provides an image through a modular display apparatus generally does not have a display, it is difficult for the user to check the IP address of the electronic apparatus until the electronic apparatus is connected to the modular display apparatus, and the IP address of the electronic apparatus is difficult to be allocated.

SUMMARY

Provided are an electronic apparatus to which an IP address is pre-allocated and a control method thereof.

Additional aspects will be set forth in part in the description which follows and, in part, will be apparent from the description, or may be learned by practice of the presented embodiments.

According to an aspect of the disclosure, there is provided an electronic apparatus configured to communicate with a display apparatus including a plurality of display modules, the electronic apparatus including: an Ethernet switch; and a processor connected to the Ethernet switch and including a virtual Ethernet port to which an Internet Protocol (IP) address is pre-allocated, wherein the processor is configured to: configure a network with an external electronic apparatus based on the IP address, and based on a signal for setting a screen of a display module, among the plurality of display modules, connected to a port of the Ethernet switch being received from the external electronic apparatus through the network, control the Ethernet switch to transmit the signal for setting the screen to the display module.

The Ethernet switch may be configured to receive the signal for setting the screen from the external electronic apparatus, and the processor may be further configured to receive the signal for setting the screen from the Ethernet switch through the virtual Ethernet port.

The processor may be further configured to: based on a signal for allocating an IP address of the display module connected to the port of the Ethernet switch being received from the external electronic apparatus, identify a port of a universal asynchronous receiver-transmitter (UART) switch of the electronic apparatus to transmit the signal for allocating the IP address based on port information included in the signal for allocating the IP address, and control the UART switch to transmit the signal for allocating the IP address through the port of the UART switch.

The UART switch may be configured to transmit the signal for allocating the IP address to the display module for allocating the IP address through a port connected to the display module for allocating the IP address.

The processor may be further configured to: operate as a peer-to-peer (P2P) group owner (GO) to configure a network with the display apparatus and the external electronic apparatus, and receive, from the display apparatus, the signal for setting the screen of the display module transmitted from the external electronic apparatus to the display apparatus through the network.

The processor may be further configured to: based on a signal for allocating an IP address of the display module connected to the port of the Ethernet switch being received from the display apparatus, identify a port to transmit the signal for allocating the IP address among a plurality of ports of a universal asynchronous receiver-transmitter (UART) switch of the electronic apparatus based on port information to transmit the signal for allocating the IP address included in the signal for allocating the IP address, and control the UART switch to transmit the signal for allocating the IP address through the port of the UART switch.

The processor may be further configured to: receive the signal for setting the screen of the display module from the external electronic apparatus through the virtual Ethernet port in a state in which IP address allocation of the plurality of display modules is completed, and based on the IP address included in the signal for setting the screen, perform setting the screen of the display module corresponding to the IP address among the plurality of display modules.

The processor may be further configured to configure a local network with the external electronic apparatus through the virtual Ethernet port.

According to an aspect of the disclosure, there is provided a method of controlling an electronic apparatus configured to communicate with a display apparatus including a plurality of display modules, the method including: configuring a network with an external electronic apparatus based on a pre-allocated Internet Protocol (IP) address; receiving a signal for setting a screen of a display module, from among the plurality of display modules, connected to a port of an Ethernet switch from the external electronic apparatus through the network; and controlling the Ethernet switch to transmit the signal for setting the screen to the display module.

The Ethernet switch may be configured to receive the signal for setting the screen from the external electronic apparatus, and the receiving the signal for setting the screen of the display module may include receiving the signal for setting the screen from the Ethernet switch through a virtual Ethernet port.

The method may further include: receiving a signal for allocating an IP address of the display module connected to the port of the Ethernet switch from the external electronic apparatus; based on port information included in the signal for allocating the IP address, identifying a port of a universal asynchronous receiver-transmitter (UART) switch of the electronic apparatus to transmit the signal for allocating the IP address; and controlling the UART switch to transmit the signal for allocating the IP address through the port of the UART switch.

The UART switch may be configured to transmit the signal for allocating the IP address to the display module for allocating the IP address through a port connected to the display module for allocating the IP address.

The electronic apparatus may be configured to operate as a peer-to-peer (P2P) group owner (GO) to configure a network with the display apparatus and the external electronic apparatus, and the receiving the signal for setting the screen of the display module may include receiving, from the display apparatus, the signal for setting the screen of the display module transmitted from the external electronic apparatus to the display apparatus through the network.

The method may further include: receiving the signal for allocating the IP address of the display module connected to the port of the Ethernet switch from the display apparatus; based on port information to transmit the signal for allocating the IP address included in the signal for allocating the IP address, identifying a port to transmit the signal for allocating the IP address among a plurality of ports of a universal asynchronous receiver-transmitter (UART) switch of the electronic apparatus; and controlling the UART switch to transmit the signal for allocating the IP address through the port of the UART switch.

The method may further include: receiving the signal for setting the screen of the display module from the external electronic apparatus through a virtual Ethernet port in a state in which IP address allocation of the plurality of display modules is completed; and based on the IP address included in the signal for setting the screen, performing setting the screen of the display module corresponding to the IP address among the plurality of display modules.

According to aspects of one or more embodiments of the disclosure as described above, an IP address may be easily allocated to a plurality of display modules included in a display apparatus through an electronic apparatus to which the IP address is previously allocated. Also, the user may perform screen control of the display apparatus while checking a screen of the display apparatus near the display apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used in the present specification and claims may be selected as general terms in consideration of the function of the disclosure. However, terms may be varied according to intention of the person skilled in the art, legal or technical interpretation, and emergence of new technology. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Further, example embodiments will be described in detail below with reference to the accompanying drawings and contents described in the accompanying drawings, but the disclosure is not restricted or limited by the example embodiments.

Hereinafter, certain exemplary embodiments will now be explained in detail with reference to the accompanying drawings.

Figure 1:
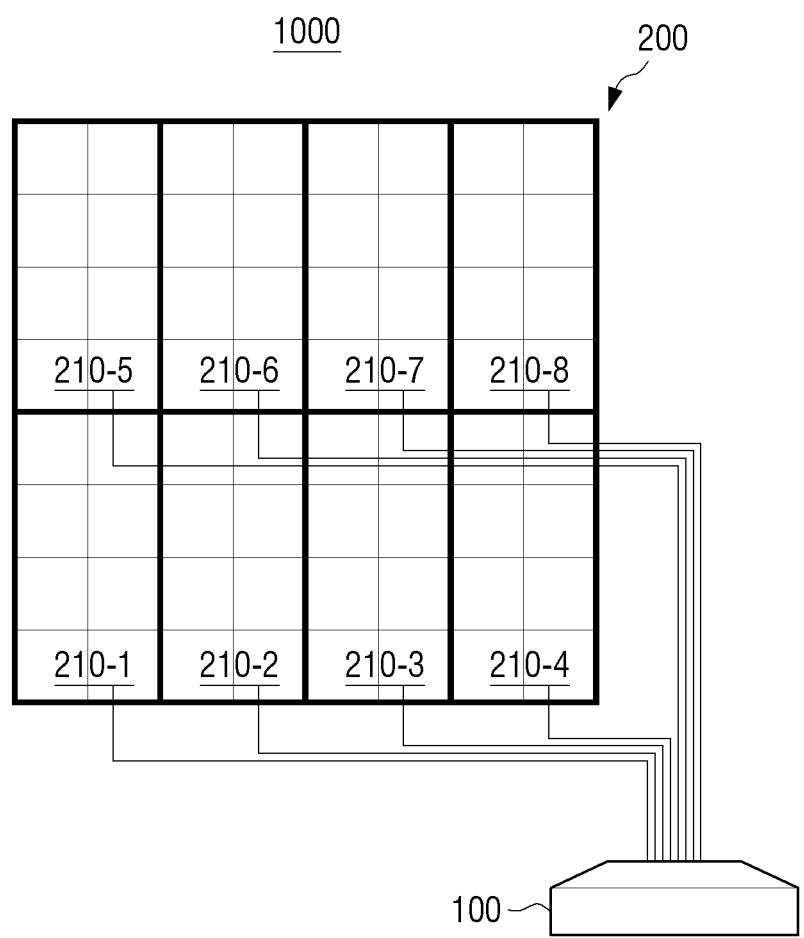
FIG. 1 is a diagram illustrating an electronic system according to an embodiment.

FIG. 1 is a diagram illustrating an electronic system according to an embodiment.

Referring to FIG. 1, an electronic system 1000 according to an embodiment of the disclosure includes an electronic apparatus 100 and a display apparatus 200.

The electronic apparatus 100 and the display apparatus 200 may transmit and receive various data by performing communication. The display apparatus 200 may be a modular display apparatus including a plurality of display modules.

The electronic apparatus 100 may transmit video data to the display apparatus 200. In some embodiments, the electronic apparatus 100 may transmit video data acquired by processing the input video content and control data for displaying an image based on the video data to the display apparatus 200. The video data is data including information about an image, and may include, for example, red (R), green (G), and blue (B) pixel information. In addition, the control data is data for displaying an image based on the corresponding video data, and may include information on an IP address of the display module or the like.

Also, the electronic apparatus 100 may transmit data for setting a screen of the display apparatus 200 to the display apparatus 200. The data for setting the screen may include, for example, information for setting at least one of contrast or luminance of the display module.

Also, the electronic apparatus 100 may transmit a signal for allocating an IP address of each display module included in the display apparatus 200 to the display apparatus 200.

The display apparatus 200 may display an image based on video data transmitted from the electronic apparatus 100. The display apparatus 200 may be implemented as a TV, and may be implemented in various devices having a display function, such as a video wall, a large format display (LFD), a digital signage, a digital information display (DID), a projector display, etc., but may be applicable without limitation. For this operation, the electronic apparatus 100 may be implemented in various types of a liquid crystal display (LCD), a light-emitting diode (LED), an organic light-emitting diode (OLED), a liquid crystal on silicon (LCoS), a digital light processing (DLP), a quantum dot (QD) display panel, and a quantum dot light-emitting diodes (QLED), or the like.

According to an embodiment, the display apparatus 200 may be a modular display apparatus including a plurality of display modules. For example, referring to FIG. 1, the display apparatus 200 may include 64 display modules arranged in an 8×8 configuration. However, this is an example, and the number or arrangement of display modules included in the display apparatus 200 may be different according to other embodiments.

In embodiments of the present disclosure, a plurality of display modules of the display apparatus 200 may be divided into a plurality of cabinets. For example, referring to FIG. 1, the display apparatus 200 may include eight cabinets 210-1, 210-2, 210-3, 210-4, 210-5, 210-6, 210-7, and 210-8 arranged in 2×4 configuration, and each cabinet may include eight display modules arranged in a 4×2 configuration. However, this is an example, and the number of cabinets, the arrangement of the cabinets, the number of display modules included in the cabinet, or the arrangement of the display modules included in the cabinet may be different according to other embodiments.

Each master display module included in the plurality of cabinets of the display apparatus 200 may be connected to the electronic apparatus 100. The master display module may be a display module connected to the electronic apparatus 100 among a plurality of display modules included in each cabinet. In the case of FIG. 1, the master module of each cabinet may be a display module located at the lowest end on the right side among the plurality of display modules included in each cabinet. In embodiments of the present disclosure, the display apparatus 100 and the electronic apparatus 100 may be connected via an optical cable, but the disclosure is not limited thereto and may be connected via a copper cable. Also, the display apparatus 100 and the electronic apparatus 100 may be connected through wireless communication.

The plurality of display modules of the display apparatus 200 may include a plurality of self-luminous elements. The self-luminous element may be a Light Emitting Diode (LED). The LED may be implemented as an RGB LED, and the RGB LED may include a RED LED, a GREEN LED, and a BLUE LED. In addition, the LED may additionally include a white LED in addition to the RGB LED.

According to an embodiment, the LED element may be implemented as a micro LED. The micro LED may be an LED having a size of about 5 to 100 micrometers, and may be a micro-light emitting diode that emits light without a color filter.

The plurality of display modules included in the display apparatus 200 may be connected in a daisy chain method.

The daisy chain method is a method of connecting a plurality of display modules in series, and as the plurality of display modules are connected in the daisy chain method, data transmitted by the electronic apparatus 100 to the display apparatus 200 may be sequentially transmitted to all of the display modules. In an embodiment, when the display apparatus 200 includes first to third display modules, a first display module receiving data from the electronic apparatus 100 transmits the received data to the second display module connected in series with the first display module, and the second display module receiving data from the first display module transmits the received data to the third display module connected in series with the second display module, such that the data may be sequentially transmitted to all of the plurality of display modules connected in series.

For example, referring to FIG. 1, the plurality of display modules included in the plurality of cabinets 210-1, 210-2, 210-3, 210-4, 210-5, 210-6, 210-7, and 210-8 may be connected in the daisy chain method. In some embodiments, the plurality of display modules included in each cabinet may be vertically connected in a daisy chain method, and two lowermost display modules included in each cabinet may be horizontally connected in a daisy chain method. In this case, data transmitted to a master display module located at the lowest end on the right side of each cabinet may be sequentially transmitted to the plurality of display modules connected in a daisy chain method.

The example described above is only one embodiment, and all display modules included in each cabinet 210-1, 210-2, 210-3, 210-4, 210-5, 210-6, 210-7, and 210-8 may be connected in the daisy chain method, or all display modules included in the display apparatus 200 may be connected in the daisy chain method.

Figure 2:
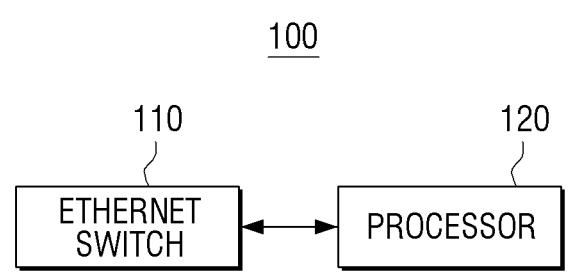
FIG. 2 is a block diagram illustrating a configuration of an electronic apparatus according to an embodiment.

FIG. 2 is a block diagram illustrating a configuration of an electronic apparatus according to an embodiment.

Referring to FIG. 2, the electronic apparatus 100 according to an embodiment of the disclosure may include Ethernet switch 110 and a processor 120.

The Ethernet switch 110 may transmit data to the display apparatus 200. In some embodiments, the Ethernet switch 110 may be connected to the display apparatus 200 through a plurality of ports, and may broadcast data to the display apparatus 200 through the plurality of ports. The data may be video data for displaying an image, as well as control data required for displaying the image. Alternatively, the data is data for setting a screen of the display apparatus 200, and may be data for controlling at least one of contrast or luminance of a display module included in the display apparatus 200.

For this operation the Ethernet switch 110 may include a plurality of ports that can be connected to the plurality of display modules of the display apparatus 200. For example, as shown in FIG. 1, when the display apparatus 200 includes eight cabinets 210-1, 210-2, 210-3, 210-4, 210-5, 210-6, 210-7, and 210-8 arranged in a 2×4 configuration, and when each cabinet includes 8 display modules arranged in a 4×2 configuration, the Ethernet switch 110 may include a port connected to the master display module of each cabinet. The master display module may be a display module connected to the Ethernet switch 110 among the plurality of display modules included in each cabinet. In the case of FIG. 1, the master module of each cabinet may be a display module located at the lowest end on the right side among the plurality of display modules included in each cabinet.

Also, the Ethernet switch 110 may transmit a signal for allocating an IP address of each display module included in the display apparatus 200 to the processor 120. In some embodiments, the Ethernet switch 110 may be connected to the processor 120 through a virtual Ethernet port of the processor 120, and transmit a signal for allocating an IP address to the processor 120 through a cable connected to the virtual Ethernet port. The signal for allocating the IP address may be a signal transmitted by an external electronic apparatus 300 to the Ethernet switch 110 based on a user input inputted to the external electronic apparatus 300.

The processor 120 controls the overall operation of the electronic apparatus 100. The processor 230 may include one or more of a central processing unit (CPU), an application processor (AP), and communication processor (CP). Also, the processor 120 may include a graphic processing unit (GPU) for graphic processing. In addition, the processor 120 may be implemented as a system on chip (SoC) including a core and a GPU. The core may include a single core, a dual core, a triple core, a quad core, or multiple cores thereof.

The processor 120 may transmit and receive various data by communicating with the Ethernet switch 110. For this operation the processor 120 may be connected to the Ethernet switch 110. Hereinafter, operations of an electronic apparatus will be described with reference to FIGS. 3 and 4.

Figure 3:
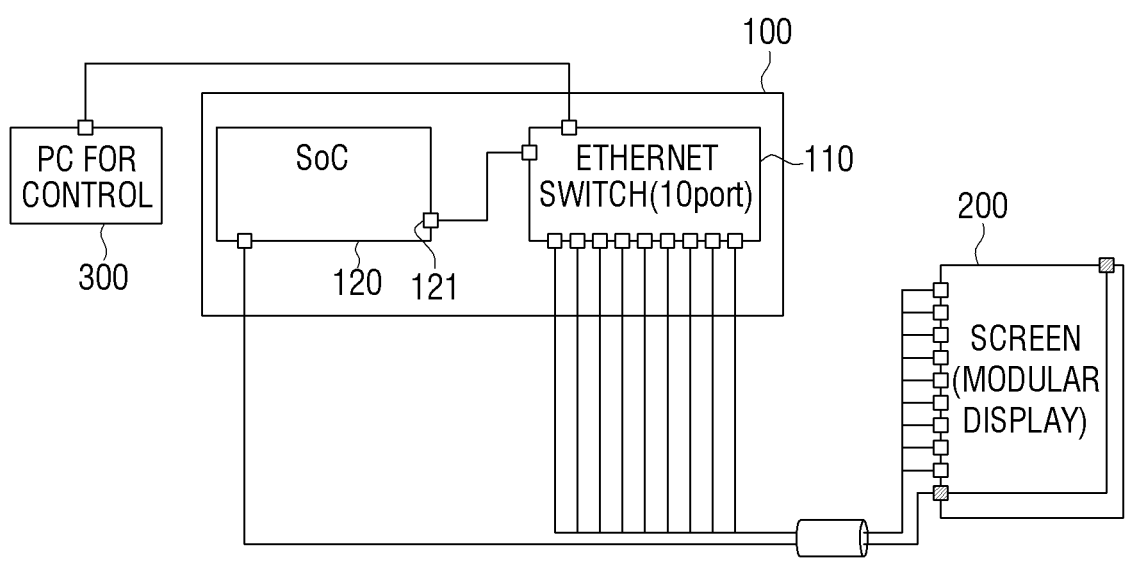
FIG. 3 is a diagram illustrating an operation of an electronic apparatus according to an embodiment.

FIG. 3 is a diagram illustrating an operation of an electronic apparatus according to an embodiment.

Referring to FIG. 3, the processor 120 may be connected to the Ethernet switch 110. In some embodiments, the processor 120 may include a virtual interface to which an IP address is allocated in advance, and may be connected to the Ethernet switch 110 through the virtual interface. For example, the virtual interface may be implemented as a virtual Ethernet port 121, and in this case, the processor 120 may be connected to the Ethernet switch 110 through the virtual Ethernet port 121.

In embodiments of the present disclosure, the virtual Ethernet port 121 of the processor 120 may be connected to the Ethernet switch 110 through a flat flexible cable (FFC), but is not limited thereto, and the virtual Ethernet port 121 may be connected to the Ethernet switch through various cables such as a flexible printed circuit (FPC) cable, or the like.

An IP address of the virtual Ethernet port 121 may be pre-allocated in a product manufacturing stage. Particularly, the virtual Ethernet port 121 may be pre-allocated with an IP address different from an IP address that is generally pre-allocated to a router. For example, in general, if the IP address pre-allocated to the router is 192.168.0.1, the virtual Ethernet port 121 may be pre-allocated with an IP address such as 192.168.176.1. Accordingly, the electronic apparatus 100 may prevent an IP address collision problem with other electronic apparatuses in the home. In embodiments of the present disclosure, the IP address described above is an example, and the IP address of the virtual Ethernet port 121 may be variously allocated according to a user command.

The processor 120 may configure a network with the external electronic apparatus 300 based on the IP address pre-allocated to the virtual Ethernet port 121. The external electronic apparatus 300 is a control device for setting a screen of the display apparatus 200 or allocating an IP address of the display apparatus 200, and may receive a user input such as a computer, a PC, a notebook computer, etc., and may be implemented as various electronic apparatuses capable of communicating with the electronic apparatus 100. In embodiments of the present disclosure, the screen setting may be at least one of contrast or luminance of the plurality of display modules included in the display apparatus 200, but is not necessarily limited thereto.

In some embodiments, an IP address pre-allocated to the virtual Ethernet port 121 may be input to the external electronic apparatus 300 by a user input. In this case, the external electronic apparatus 300 may store the input IP address as an IP address of the electronic apparatus 100 and configure a network with the electronic apparatus 100. In other words, when the IP address of the virtual Ethernet port 121 is input through the inputter of the external electronic apparatus 300, the external electronic apparatus 300 may be in a state capable of transmitting and receiving various data with the electronic apparatus 100. The disclosure does not require separate user input for allocating an IP address to the electronic apparatus 100 or for configuring a network with the external electronic apparatus 300 based on the IP address pre-allocated to the virtual Ethernet port 121. Since an electronic apparatus that provides an image to the display apparatus 200 generally does not have a display, it is difficult to check the IP address allocated to the electronic apparatus until the electronic apparatus is connected to the display apparatus, and the problem of the conventional electronic apparatus that the IP address of the electronic apparatus is difficult to be allocated may be solved. In addition, the electronic apparatus 100 configures a local network with the external electronic apparatus 300 through the virtual Ethernet port 121, thereby preventing problems that may be caused by hacking.

In an embodiment, the processor 120 may receive a signal for allocating an IP address of a display module included in the display apparatus 200 from the external electronic apparatus 300. For example, when a user input for allocating an IP address of a display module included in the display apparatus 200 is input through the inputter of the external electronic apparatus 300, the external electronic apparatus 300 may transmit a signal for allocating the IP address of the display module to the Ethernet switch 110 connected to the external electronic apparatus 300. A destination field of the signal for allocating the IP address may include, for example, the IP address of the virtual Ethernet port 121, and a payload of the signal for allocating the IP address may include, for example, information for allocating the IP address of the display module connected to a first port of a universal asynchronous receiver-transmitter (UART) switch of the electronic apparatus 100 as 192.168.176.101.

For this operation the external electronic apparatus 300 and the Ethernet switch 110 may be connected through various cables. As an example, the cable may be a copper cable as well as an optical cable. In addition, the electronic apparatus 100 may include a wireless communication chip such as a Bluetooth chip and a Wi-Fi chip, and the Ethernet switch 110 may receive a signal for allocating an IP address of the display module from the external electronic apparatus 300 through a wireless communication.

When a signal for allocating an IP address of the display module is received from the external electronic apparatus 300, the Ethernet switch 110 may transmit a signal for allocating an IP address to an electronic apparatus connected through a port of the Ethernet switch 110. As an example, when a signal for allocating the IP address of the display module is received from the external electronic apparatus 300, the Ethernet switch 110 may transmit a signal for allocating the IP address to the processor 120 through the port of the Ethernet switch 110 connected to the virtual Ethernet port 121.

When the signal for allocating the IP address of the display module is received, the processor 120 may identify a port to transmit the signal for allocating the IP address among a plurality of ports of the UART switch of the electronic apparatus 100. The UART switch is a device connected to a plurality of display modules of the display apparatus 100 through a plurality of ports. For example, the plurality of ports of the UART switch may be connected to a plurality of display modules of the display apparatus 100 through an optical cable.

In some embodiments, the processor 120 may identify a port to transmit a signal for IP address allocation among the plurality of ports of the UART switch based on information on ports included in the signal for allocating the IP address. For example, if the signal for allocating an IP address includes information on the first port, the processor 120 may identify a first port among the plurality of ports of the UART switch as the port to transmit the signal for allocating the IP address.

Also, the processor 120 may control the UART switch to transmit the signal for allocating the IP address to the display module through the port identified based on the information on the port included in the signal for IP address allocation. As the embodiment described above, when information on the first port is included in the signal for allocating the IP address, the processor 120 may control the UART switch to transmit a signal for allocating the IP address through the first port to the display apparatus 200. In this case, the UART switch may transmit the signal for allocating the IP address to the display module for allocating the IP address through the port connected to the display module for allocating the IP address. In addition, the processor 120 may match and store the IP address included in the signal for IP address allocation in the display module connected to the corresponding port. IP addresses may be allocated to a plurality of master display modules included in the display apparatus 200 through the method described above.

For example, as shown in FIG. 1, as the display apparatus 200 includes eight cabinets 210-1, 210-2, 210-3, 210-4, 210-5, 210-6 210-7, and 210-8 in a 2×4 configuration, and each cabinet includes eight display modules arranged in a 4×2 configuration, in a state in which eight master display modules are connected to eight ports of the Ethernet switch 110, when a signal for allocating a first IP address to a first master display module is received from the external electronic apparatus 300, the processor 120 may transmit the first IP address to the first master display module through the UART switch and allocate the first IP address to the first master display module. In addition, the processor 120 may allocate IP addresses to second to eighth master display modules in a method similar to the method described above.

In embodiments of the present disclosure, the master display module to which the IP address is allocated may allocate an IP address to each of the remaining display modules connected in the daisy chain method through a Dynamic Host Configuration Protocol (DHCP) function. The DHCP function is a function in which a master device dynamically allocates different IP addresses to slave devices such that IP addresses do not collide between devices connected in the daisy chain method. The master display module may allocate different IP addresses to each slave display module connected in the daisy chain method. In case of FIG. 1 as an example, a master display module of a first cabinet 210-1 may set an IP address of the master display module based on the signal for IP address allocation received from the electronic apparatus 100, and allocate IP addresses to the remaining display modules included in the first cabinet 210-1 such that the IP addresses do not overlap. IP addresses may be allocated to the plurality of display modules included in the second to eighth cabinets 210-2, 210-3, 210-4, 210-5, 210-6, 210-7, and 210-8 in a method similar to the method described above. In embodiments of the present disclosure, the master display module may allocate a unique ID to each of the slave display modules when allocating an IP address to each of the slave display modules connected in the daisy chain method. In some embodiments, the master display module may allocate different IDs to each of the plurality of slave display modules included in its group.

In addition, the display apparatus 200 may transmit IP addresses allocated to the plurality of display modules and/or ID information allocated to the plurality of display modules to the electronic apparatus 100. Accordingly, the electronic apparatus 100 may acquire IP addresses of the plurality of display modules included in the display apparatus 100 and/or ID information allocated to the plurality of display modules.

As such, when IP address allocation of the plurality of display modules of the display apparatus 200 is completed, the processor 120 may control the plurality of display modules based on the IP addresses of the plurality of display modules.

Alternatively, when IP address allocation of the plurality of master display modules of the display apparatus 200 is completed and ID allocation of the plurality of slave display modules is completed, the processor 120 may control each master display module based on the IP address of each master display module, and control each slave display module based on ID information of each slave display module.

For example, in a state in which IP address allocation of the plurality of display modules is completed, a signal for screen setting (e.g., contrast or luminance setting) of the display apparatus 200 is received from the external electronic apparatus 300 through the virtual Ethernet port 121, the processor 120 may transmit the signal for screen setting to each master display module of the display apparatus 200 through each port of the Ethernet switch 100. In this case, the plurality of display modules of the display apparatus 200 may receive the signal for screen setting through the daisy chain method. In addition, the plurality of display modules of the display apparatus 200 may identify whether to perform an operation corresponding to a command included in the data based on whether the IP address included in the signal for screen setting matches its own IP address.

For example, when transmitting data for increasing a luminance value of the first display module as much "a" among the plurality of display modules of the first cabinet, the processor 120 may include an IP address of the first display module in a destination field of a data packet including a command to increase the luminance value as much "a".

In this case, the Ethernet switch 110 may transmit data for increasing the luminance value of the first display module as much "a" to a plurality of master display modules through the plurality of ports. In addition, the plurality of master display modules that have received data may transmit data to the plurality of display modules connected in the daisy chain method, and each of the display modules that have received data may identify whether to perform an operation corresponding to the command included in the data based on whether the IP address included in the destination field matches its IP address. Accordingly, the first display module may increase the luminance value as much "a" among the plurality of displays included in the first cabinet 210-1.

In the above, an embodiment in which the electronic apparatus 100 and the external electronic apparatus 300 are connected through a wired cable has been mainly described.

However, the disclosure is not necessarily limited thereto, and the electronic apparatus 100 may be connected to the external electronic apparatus 300 through wireless communication. Hereinafter, it will be described with reference to FIG. 4.

Figure 4:
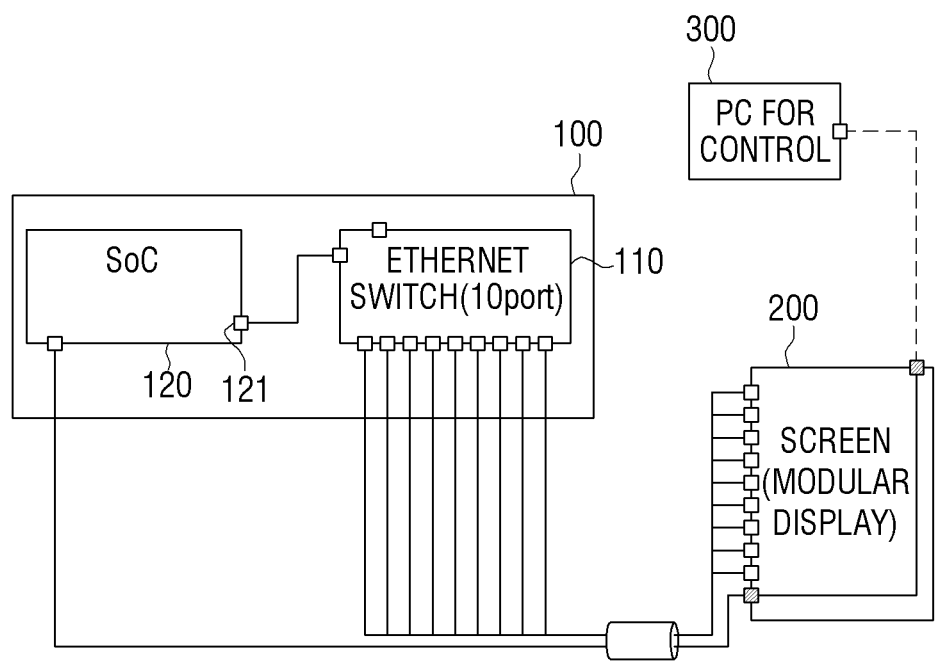
FIG. 4 is a diagram illustrating an operation of an electronic apparatus according to an embodiment.

FIG. 4 is a diagram illustrating an operation of an electronic apparatus according to an embodiment.

The electronic apparatus 100, the display apparatus 200, and the external electronic apparatus 300 according to an embodiment of the disclosure may form a peer-to-peer (P2P) group. In some embodiments, the processor 120 of the electronic apparatus 100 may operate as a group owner (GO) and perform an AP function relaying communication between group clients (GCs) connected to the electronic apparatus 100, and the display apparatus 200 and the external electronic apparatus 300 may communicate through the electronic apparatus 100 as a group client.

For this operation the electronic apparatus 100, the display apparatus 200, and the external electronic apparatus 300 may perform operations of finding a nearby device and forming a group among the found devices. The operation of finding nearby devices may include searching for a device through a probe request frame and listening a response with a probe response frame when the probe request frame is received. In addition, the forming a group between devices may include a group owner negotiation operation. In the owner negotiation operation, each device may exchange an owner negotiation request frame (GO negotiation request frame), and the owner negotiation request frame may include a group owner intent (GOI). The group owner intent is a value determined by a performance of each device, and a group owner intent of the electronic apparatus 100 according to an embodiment of the disclosure may be set higher than the group owner intent of the display apparatus 200 and the external electronic apparatus 300. Accordingly, in the owner negotiation operation, the electronic apparatus 100 may be determined as the group owner.

As a group owner, the electronic apparatus 100 may allocate an IP address to a group client, that is, the display apparatus 200 and the external electronic apparatus 300 through a Dynamic Host Configuration Protocol (DHCP) function. The IP address may be a private IP address usable within the corresponding P2P group. For example, the electronic apparatus 100 may allocate an IP address of 192.168.49.1 to the display apparatus 200 and may allocate an IP address of 192.168.49.100 to the external electronic apparatus 300. Accordingly, the display apparatus 200 and the external electronic apparatus 300 may configure a network through the electronic apparatus 100 that performs the AP function relaying communication between group clients. In other words, the electronic apparatus 100, the display apparatus 200, and the external electronic apparatus 300 may transmit and receive data through the AP function of the electronic apparatus 100.

Accordingly, referring to FIG. 4, the external electronic apparatus 300 may transmit a signal for allocating an IP address of the display module to the display apparatus 200, and the processor 120 may receive a signal for allocating the IP address of the display module from the display apparatus 200.

In some embodiments, the external electronic apparatus 300 may transmit a signal for allocating the IP address of the display module to the display apparatus 200 through the AP function of the electronic apparatus 100. The destination field of the signal for allocating the IP address may include an IP address of the processor 120, which is the group owner. Accordingly, the display apparatus 200 may transmit the signal for allocating an IP address received from the external electronic apparatus 300 to the processor 120. In embodiments of the present disclosure, in FIG. 4, it has been described that the display apparatus 200 is connected to the electronic apparatus 100 through an optical cable and transmits a signal for allocating an IP address to the electronic apparatus 100 through the optical cable, but It is only an example. For example, the display apparatus 200 may transmit a signal for allocating an IP address to the electronic apparatus 100 through wireless communication.

When the signal for allocating the IP address of the display module is received, the processor 120 may identify a port to transmit the signal for allocating the IP address among a plurality of ports of the UART switch (not shown). In some embodiments, the processor 120 may identify a port to transmit a signal for IP address allocation among the plurality of ports of the UART switch based on information on ports included in the signal for allocating the IP address. For example, if the signal for allocating an IP address includes information on the first port, the processor 120 may identify a first port among the plurality of ports of the UART switch as the port to transmit the signal for allocating the IP address.

Also, the processor 120 may control the UART switch to transmit the signal for allocating the IP address to the display module through the port identified based on the information on the port included in the signal for IP address allocation. In this case, the UART switch may transmit the signal for allocating the IP address to the display module for allocating the IP address through the port connected to the display module for allocating the IP address.

IP addresses may be allocated to a plurality of master display modules included in the display apparatus 200 through the method described above.

For example, as shown in FIG. 1, as the display apparatus 200 includes eight cabinets 210-1, 210-2, 210-3, 210-4, 210-5, 210-6 210-7, and 210-8 in a 2×4 configuration, and each cabinet includes eight display modules arranged in a 4×2 configuration, in a state in which eight master display modules are connected to eight ports of the Ethernet switch 110, when a signal for allocating the first IP address to a first master display module is received from the external electronic apparatus 300 through the display apparatus 200, the processor 120 may transmit the first IP address to the first master display module through the UART switch and allocate the first IP address to the first master display module. In addition, the processor 120 may allocate IP addresses to second to eighth master display modules in a method similar to the method described above.

In embodiments of the present disclosure, the master display module to which the IP address is allocated may allocate an IP address to each of the remaining display modules connected in the daisy chain method through a Dynamic Host Configuration Protocol (DHCP) function. In addition, the display apparatus 200 may transmit the IP addresses allocated to the plurality of display modules to the electronic apparatus 100. Accordingly, the electronic apparatus 100 may acquire IP addresses of the plurality of display modules included in the display apparatus 100. Alternatively, as described above, the processor 120 may receive ID information allocated to the plurality of slave display modules from the master display module.

As such, when IP address allocation of the plurality of display modules of the display apparatus 200 is completed, the processor 120 may perform screen setting of display modules based on the IP addresses of the plurality of display modules.

Alternatively, when IP address allocation of the plurality of master display modules of the display apparatus 200 is completed and ID allocation of the plurality of slave display modules is completed, the processor 120 may perform screen setting of each master display module based on the IP address of each master display module, and perform screen setting of each slave display module based on ID information of each slave display module.

As described above, according to the disclosure, a signal for setting a screen may be received from the external electronic apparatus 300 connected to the display apparatus 200 through wireless communication. Accordingly, the user may easily perform set a screen of the display apparatus while identifying a screen of the display apparatus near the display apparatus.

Figure 5:
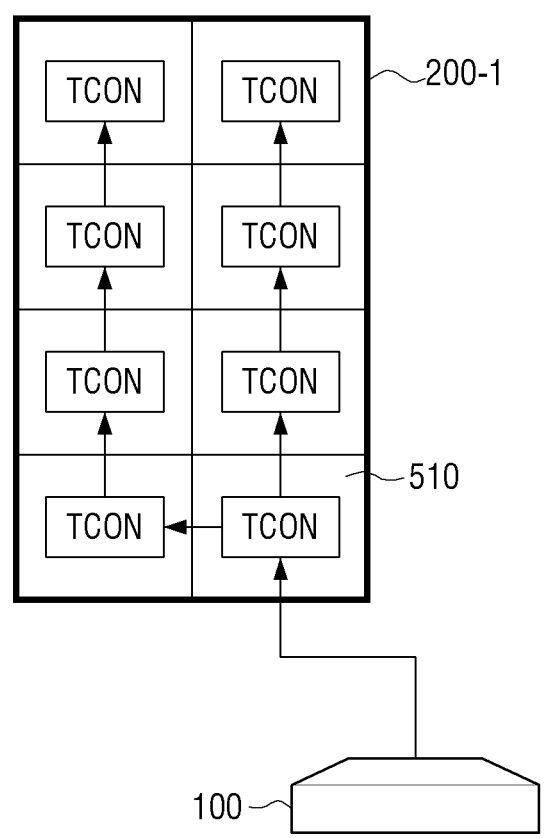
FIG. 5 is a diagram illustrating an operation of a display apparatus according to an embodiment.

FIG. 5 is a diagram illustrating an operation of a display apparatus according to an embodiment.

FIG. 5 illustrates the first cabinet 210-1 among the plurality of cabinets 210-1, 210-2, 210-3, 210-4, 210-5, 210-6, 210-7 and 210-8 of FIG. 1 to describe an operation of a display apparatus according to an embodiment of the disclosure. Hereinafter, the operation of the display apparatus 200 in the first cabinet 210-1 will be described, but may be similarly applied to the remaining cabinets 210-2, 210-3, 210-4, 210-5, 210-6, 210-7, and 210-8.

As shown in FIG. 5, a first port among a plurality of ports of the electronic apparatus 100 may be connected to the first cabinet 210-1 including a plurality of display modules arranged in a 4×2 configuration. In some embodiments, a master display module 510 among the plurality of display modules coupled in a daisy chain method may be connected to the first port of the electronic apparatus 100.

Accordingly, the processor 120 may transmit various data to the master display module 510. For example, the processor 120 may transmit a signal for setting contrast or luminance of at least one of the plurality of display modules included in the first cabinet 210-1 to the master display module 510.

In this case, the master display module 510 may transmit data received from the electronic apparatus 100 to the display modules located at the left and upper side connected in the daisy chain method. In some embodiments, the processor of the master display module 510 (for example, it may be a timing controller TCON) may transmit the data received from the electronic apparatus 100 to the display module located at the left and upper side connected in the daisy chain method. In addition, the display module that has received data from the master display module 510 may transmit the received data to the display module located at an upper side connected in the daisy chain method.

As such, data may be transmitted to a plurality of display modules included in the first cabinet 210-1 located at the top.

The data may be video data, and the video data may also be transmitted to the plurality of display modules included in the cabinet in a method similar to the method described above. Accordingly, the plurality of cabinets of the display apparatus 200 may display an image based on the received video data.

The number of cabinets, the arrangement of the cabinets, the number of display modules included in the cabinet, or the arrangement of the display modules included in the cabinet may be different according to other embodiments.

Figure 6:
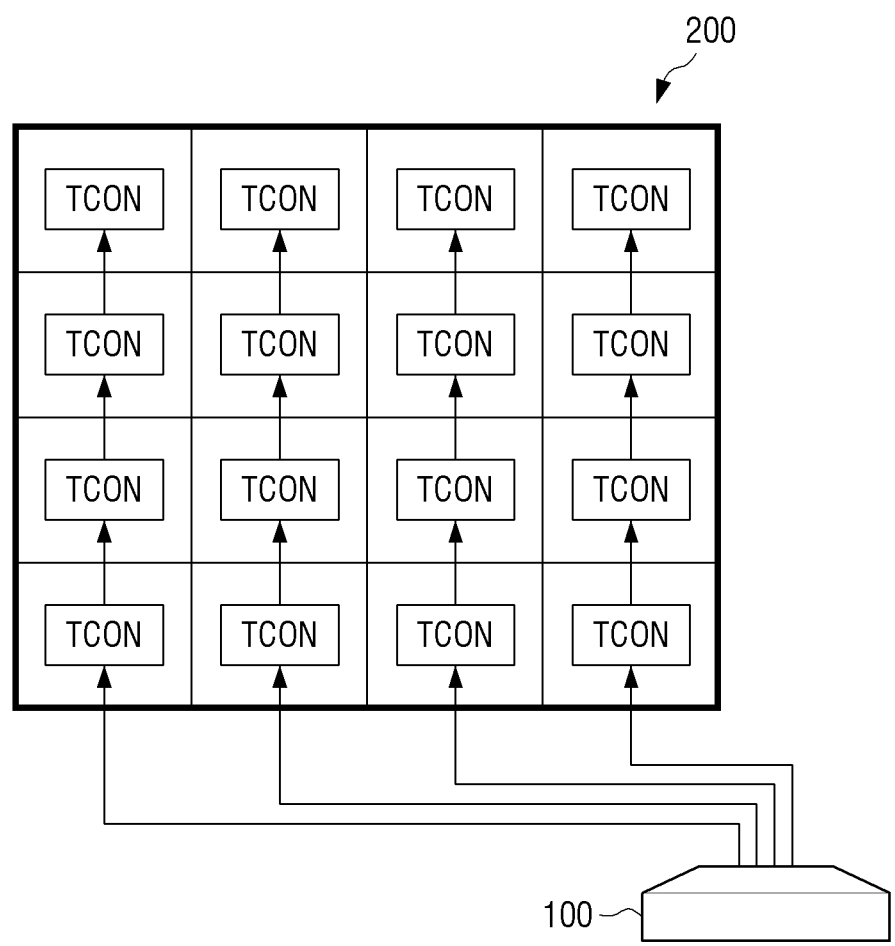
FIG. 6 is a diagram illustrating a display apparatus according to an embodiment.

FIG. 6 is a diagram illustrating a display apparatus according to an embodiment.

For example, as shown in FIG. 6, the display apparatus 200 may include four cabinets arranged in a 1×4 configuration, and each cabinet may include four display modules arranged in a 4×1 configuration.

In this case, the processor 120 may transmit a signal for setting a screen to a master display module included in each cabinet.

In addition, the master display module may transmit the data received from the electronic apparatus 100 to the display module located at the upper side connected in the daisy chain method. In some embodiments, the processor of the master display module (for example, it may be a timing controller TCON) may transmit the data received from the electronic apparatus 100 to the display module located at the upper side connected in the daisy chain method. In addition, the display module that has received data from the master display module may transmit the received data to the display module located at an upper side connected in the daisy chain method.

Figure 7:
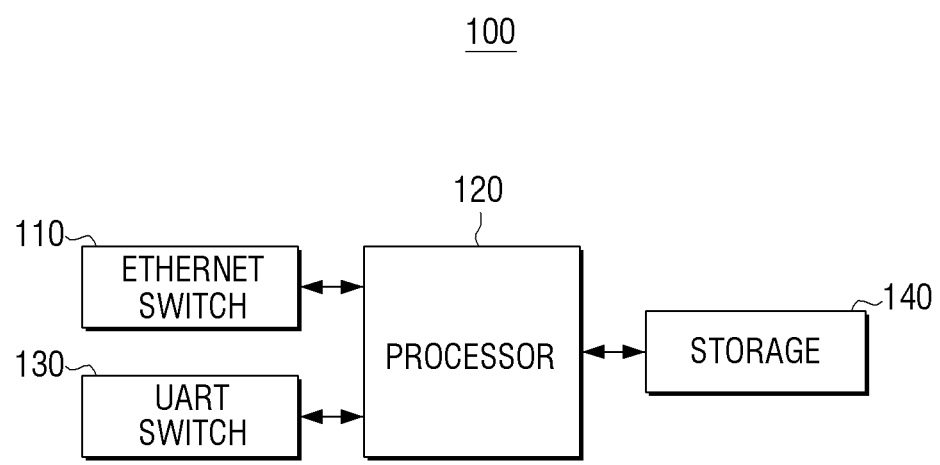
FIG. 7 is a detailed block diagram illustrating a configuration of an electronic apparatus according to an embodiment.

FIG. 7 is a detailed block diagram illustrating a configuration of an electronic apparatus according to an embodiment. Referring to FIG. 7, the electronic apparatus 100 according to an embodiment of the disclosure may include Ethernet switch 110, a UART switch 130, a storage 140, and a processor 120. Hereinafter, portions overlapping with the above description will be omitted or abbreviated.

Each of the UART switches 130 may include a plurality of ports, and may be connected to a plurality of master display modules of the display apparatus 200 through the plurality of ports. For example, the UART switch 130 may be connected to the plurality of master display modules of the display apparatus 200 through an optical cable, but is not limited thereto, and may be connected through a copper cable or connected through wireless communication.

The UART switch 130 may transmit a signal for allocating an IP address of the display apparatus 200 to the display apparatus 200 under the control of the processor 120.

Particularly, the UART switch 130 may transmit the signal for IP address allocation to the display apparatus 200 through one port among the plurality of ports. In some embodiments, when the signal for IP address allocation is received from the external electronic apparatus 300, the processor 120 may control the UART switch 130 to identify a signal for IP address allocation among the plurality of ports of the UART switch 130 and transmit a signal for IP address allocation through the corresponding port.

The storage 140 may store an operating system (OS) for controlling the overall operation of components of the electronic apparatus 100 and commands or data related to components of the electronic apparatus 100.

Accordingly, the processor 120 may control a plurality of hardware components or software elements of the electronic apparatus 100 by using diverse commands or data in the storage 140, load and process a command or data received from at least one of the other components in a volatile the memory, and store diverse data in a non-volatile memory.

The storage 140 may be implemented with various types of storage media. For example, the storage 140 may be implemented as a nonvolatile memory device such as read only memory (ROM), programmable read only memory (PROM), erasable programmable read only memory (EPROM), a flash memory, or may be implemented as a volatile memory device such as random access memory (RAM), or a storage device such as a hard disk or an optical disk.

Figure 8:
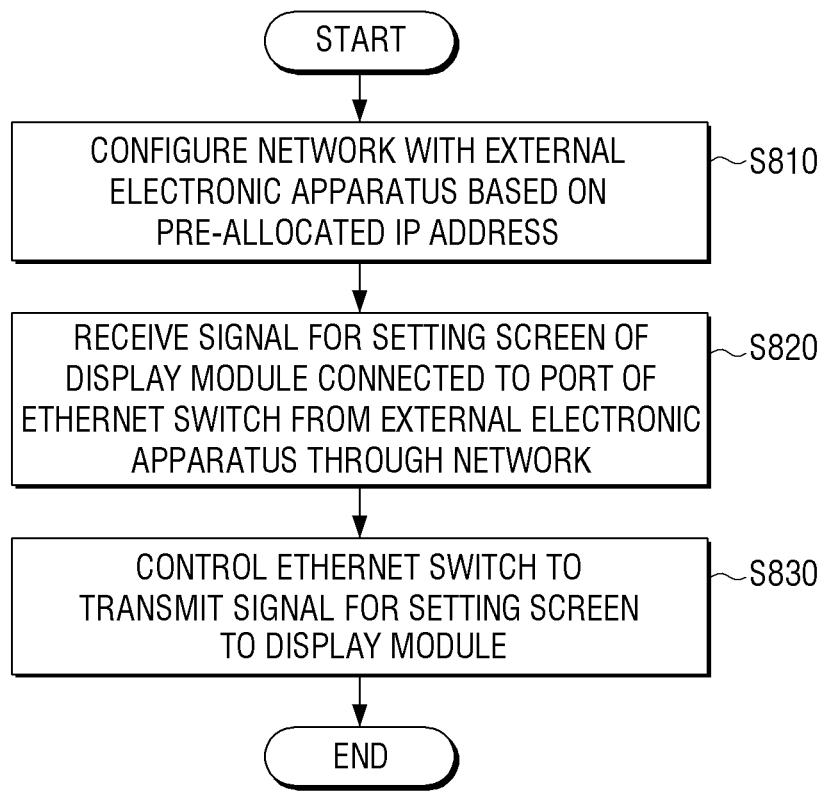
FIG. 8 is a flowchart illustrating a method of controlling an electronic apparatus according to an embodiment.

FIG. 8 is a flowchart illustrating a method of controlling an electronic apparatus according to an embodiment.

The processor 120 may configure a network with the external electronic apparatus 300 based on the IP address pre-allocated. In some embodiments, an IP address pre-allocated to the virtual Ethernet port 121 may be input to the external electronic apparatus 300 by a user input. In this case, the external electronic apparatus 300 may store the input IP address as an IP address of the electronic apparatus 100 and configure a network with the electronic apparatus 100. In other words, when the IP address of the virtual Ethernet port 121 is input through the inputter of the external electronic apparatus 300, the external electronic apparatus 300 may be in a state capable of transmitting and receiving various data with the electronic apparatus 100. Accordingly, the electronic apparatus 100 may receive various data from the external electronic apparatus 300.

In operation S820, the electronic apparatus 100 may receive a signal for setting a screen of the display module connected to the port of the Ethernet switch 110 from the external electronic apparatus 300 through the network. As an example, the electronic apparatus 100 may receive a signal for setting the IP screen from the external electronic apparatus 300 through the Ethernet switch 110, and also receive a signal for setting the screen from the external electronic apparatus 300 through the display apparatus 200.

In operation S830, the electronic apparatus 100 may control the Ethernet switch 110 to transmit a signal for setting the screen to the display module. In addition, the Ethernet switch 110 may transmit a signal for setting the screen to the display module through a port connected to the display module for setting the screen. In this case, the master display module may transmit a signal for setting the screen to each of the remaining display modules connected in the daisy chain method.

The methods according to the above-described example embodiments may be realized as software or applications that may be installed in the existing electronic apparatus.

Further, the methods according to the above-described example embodiments may be realized by upgrading the software or hardware of the existing electronic apparatus.

In addition, various exemplary embodiments as described above may be performed through an embedded server provided in the electronic apparatus or at least one of a server outside the electronic apparatus.

Embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include a code made by a compiler or a code executable by an interpreter. The machine-readable storage media may be provided in a form of a non-transitory storage media. Herein, the term "non-transitory" only denotes that a storage medium does not include a signal but is tangible, and does not distinguish the case where a data is semi-permanently stored in a storage medium from the case where a data is temporarily stored in a storage medium.

Embodiments of the present disclosure may be provided as being included in a computer program product. The computer program product may be traded between a seller and a buyer. The computer program product may be distributed online in the form of machine-readable storage media (e.g., compact disc read only memory (CD-ROM)) or through an application store (e.g., Play Store™). In the case of online distribution, at least a portion of the computer program product may be at least temporarily stored or temporarily generated in a server of the manufacturer, a server of the application store, or a storage medium such as memory.

In addition, embodiments described above may be implemented in a recording media that may be read by a computer or a similar device to the computer by suing software, hardware, or a combination thereof. In some cases, the embodiments described herein may be implemented by the processor itself. In a software configuration, embodiments described in the present disclosure such as a procedure and a function may be implemented as separate software modules. The software modules may respectively perform one or more functions and operations described in the disclosure Embodiments of the present disclosure may include computer instructions stored in a non-transitory computer-readable medium for performing processing operations of a device as described herein. The computer instructions stored in the non-transitory computer-readable medium may cause a particular device to perform processing operations on the device according to the embodiments of the present disclosure when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

The respective components (e.g., module or program) according to the various example embodiments may include a single entity or a plurality of entities, and some of the corresponding sub-components described above may be omitted, or another sub-component may be further added to the exemplary embodiments. Alternatively or additionally, some components (e.g., module or program) may be combined to form a single entity which performs the same or similar functions as the corresponding elements before being combined. Operations performed by a module, a program, or other component, according to exemplary embodiments, may be sequential, parallel, or both, executed iteratively or heuristically, or at least some operations may be performed in a different order, omitted, or other operations may be added.

While the disclosure has been illustrated and described with reference to example embodiments, it will be understood that the example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus configured to communicate with a modular display apparatus including a plurality of display modules, the electronic apparatus comprising:
   an Ethernet switch; and
   a processor connected to the Ethernet switch and including a virtual Ethernet port to which an Internet Protocol (IP) address is pre-allocated,
   wherein the processor is configured to:
      configure a network with an external electronic apparatus based on the pre-allocated IP address,
      identify a port of a universal asynchronous receiver-transmitter (UART) switch of the electronic apparatus based on port information included in a first signal for allocating an IP address of a display module connected to a port of the Ethernet switch from among the plurality of display modules of the modular display apparatus, wherein the first signal is received by the processor from the external electronic apparatus through the Ethernet switch, and the UART switch and the Ethernet switch are not connected to each other directly;

control the UART switch to transmit the first signal for allocating the IP address of the display module received from the external electronic apparatus through the port of the UART switch; and based on a signal for setting a screen of the display module connected to a port of the Ethernet switch being received from the external electronic apparatus through the network, control the Ethernet switch to transmit the signal for setting the screen to the display module using the allocated IP address.

2. The electronic apparatus of claim 1, wherein the Ethernet switch is configured to receive the signal for setting the screen from the external electronic apparatus, and wherein the processor is further configured to receive the signal for setting the screen from the Ethernet switch through the virtual Ethernet port.

3. The electronic apparatus of claim 1, wherein the UART switch is configured to transmit the first signal for allocating the IP address to the display module for allocating the IP address through a port connected to the display module for allocating the IP address.

4. The electronic apparatus of claim 1, wherein the processor is further configured to:

operate as a peer-to-peer (P2P) group owner (GO) to configure the network with the modular display apparatus and the external electronic apparatus, and receive, from the modular display apparatus, the signal for setting the screen of the display module transmitted from the external electronic apparatus to the modular display apparatus through the network.

5. The electronic apparatus of claim 4, wherein the processor is further configured to:

based on a second signal for allocating the IP address of the display module connected to the port of the Ethernet switch being received from the modular display apparatus, identify the port of the UART switch to transmit the second signal for allocating the IP address among a plurality of ports of the UART switch of the electronic apparatus based on the port information to transmit the second signal for allocating the IP address included in the second signal for allocating the IP address received from the modular display apparatus, and control the UART switch to transmit the signal for allocating the IP address received from the modular display apparatus through the port of the UART switch.

6. The electronic apparatus of claim 1, wherein the processor is further configured to:

receive the signal for setting the screen of the display module from the external electronic apparatus through the virtual Ethernet port in a state in which an IP address allocation of the plurality of display modules is completed, and based on the IP address included in the signal for setting the screen, perform setting the screen of the display module corresponding to the IP address among the plurality of display modules.

7. The electronic apparatus of claim 1, wherein the processor is further configured to configure a local network with the external electronic apparatus through the virtual Ethernet port.

8. A method of controlling an electronic apparatus configured to communicate with a modular display apparatus including a plurality of display modules, the method comprising:

configuring a network with an external electronic apparatus based on a pre-allocated Internet Protocol (IP) address; identifying a port of a universal asynchronous receiver-transmitter (UART) switch of the electronic apparatus based on port information included in a first signal for allocating an IP address of a display module connected to a port of an Ethernet switch from among the plurality of display modules of the modular display apparatus, wherein the first signal is received by from the external electronic apparatus through the Ethernet switch, and the UART switch and the Ethernet switch are not connected to each other directly;

controlling the UART switch to transmit the first signal for allocating the IP address of the display module received from the external electronic apparatus through the port of the UART switch;

receiving a signal for setting a screen of the display module connected to a port of an Ethernet switch from the external electronic apparatus through the network; and controlling the Ethernet switch to transmit the signal for setting the screen to the display module.

9. The method of claim 8, wherein the Ethernet switch is configured to receive the signal for setting the screen from the external electronic apparatus, and wherein the receiving the signal for setting the screen of the display module includes receiving the signal for setting the screen from the Ethernet switch through a virtual Ethernet port.

10. The method of claim 8, wherein the UART switch is configured to transmit the first signal for allocating the IP address to the display module for allocating the IP address through a port connected to the display module for allocating the IP address.

11. The method of claim 8, wherein the electronic apparatus is configured to operate as a peer-to-peer (P2P) group owner (GO) to configure the network with the modular display apparatus and the external electronic apparatus, and wherein the receiving the signal for setting the screen of the display module includes receiving, from the modular display apparatus, the signal for setting the screen of the display module transmitted from the external electronic apparatus to the modular display apparatus through the network.

12. The method of claim 11, further comprising:

receiving a second signal for allocating the IP address of the display module connected to the port of the Ethernet switch from the modular display apparatus;

based on the port information to transmit the second signal for allocating the IP address included in the second signal for allocating the IP address received from the modular display apparatus, identifying the port of the UART switch to transmit the signal for allocating the IP address among a plurality of ports of the UART switch of the electronic apparatus; and controlling the UART switch to transmit the signal for allocating the IP address received from the modular display apparatus through the port of the UART switch.

13. The method of claim 8, further comprising:
receiving the signal for setting the screen of the display module from the external electronic apparatus through a virtual Ethernet port in a state in which an IP address allocation of the plurality of display modules is completed; and
based on the IP address included in the signal for setting the screen, performing setting the screen of the display module corresponding to the IP address among the plurality of display modules.

* * * * *